Dec. 9, 1941. H. WAGNER 2,265,461
MEANS FOR MAINTAINING AIR PRESSURE IN AIRPLANE CABINS
Filed Oct. 25, 1938 2 Sheets-Sheet 1

Inventor:
Herbert Wagner
by Grant Baldwin
Attorney.

Dec. 9, 1941.    H. WAGNER    2,265,461
MEANS FOR MAINTAINING AIR PRESSURE IN AIRPLANE CABINS
Filed Oct. 25, 1938    2 Sheets-Sheet 2
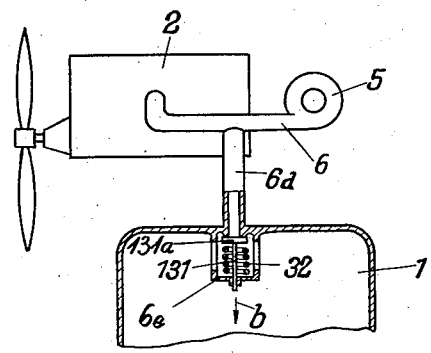
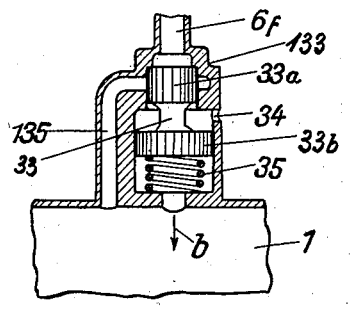
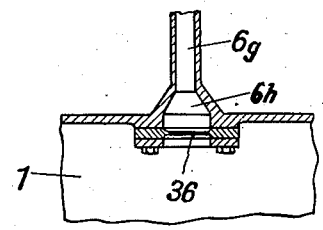
Inventor:
Herbert Wagner
By Gerald F. Baldwin
Attorney.

Patented Dec. 9, 1941

2,265,461

UNITED STATES PATENT OFFICE 2,265,461

MEANS FOR MAINTAINING AIR PRESSURE IN AIRPLANE CABINS

Herbert Wagner, Dessau, Germany, assignor to Junkers Flugzeug-und Motorenwerke Aktiengesellschaft, Dessau, Germany, a corporation of Germany Application October 25, 1938, Serial No. 236,963
In Germany October 28, 1937

6 Claims. (Cl. 128—204)

This invention relates to means for maintaining air pressure in an airplane cabin above a predetermined minimum, and relates particularly to such means applicable to airplanes the motors of which are equipped with superchargers.

At the present time it is customary to provide an airplane cabin with vents and an air pump having its suction connection either extending into the open air or connected to the discharge side of the supercharger thereon. This air pump, which is usually operated by the motor on the airplane, has just sufficient capacity to maintain a supply of fresh air at the desired pressure to replace the air which escapes through the vents and thus insure the safety and comfort of the people in the cabin. However in the event of the cabin walls becoming defective and a leak of considerable magnitude resulting, as might occur, for instance, if holes were shot through the cabin walls, the capacity of the pump would be entirely insufficient to take care of the passengers. Consequently an additional device is sometimes employed by which the airplane motor is rendered inoperative in the event that the air pressure in the cabin drops below a predetermined minimum, so that the plane must then descend to a lower altitude.

It is an object of the invention to provide a means for maintaining air pressure in an airplane cabin above a predetermined minimum without resorting to the use of a very large air pump which would add very materially to the weight of the plane, and which under normal circumstances is not necessary.

Another object of the invention is to provide means for maintaining air pressure in an airplane cabin above a predetermined minimum including means for discharging compressed air from the supercharger directly into the cabin in the event that the air pressure in the latter drops below the minimum in spite of the delivery of air from the air pump; moreover the means may either be operated by a drop in pressure of the air in the cabin, or by the difference between the air pressure in the cabin and that of the compressed air discharged by the supercharger.

A further object of the invention is to provide such an arrangement wherein means are provided for curtailing the supply of compressed air from the supercharger to the motor, in the event that this air is also being directly injected into the cabin, to reduce the motor speed to such an extent that the airplane must descend to a lower altitude.

Having thus briefly outlined the major objects and advantages of the invention I will now proceed to describe some of the preferred embodiments thereof with the aid of the accompanying drawings, in which.

Figures 3, 4, and 5 show three further modified constructions of the invention wherein the means controlling the admission of compressed air from the supercharger into the cabin is actuated by the difference in pressure between the air in the cabin and the compressed air.

Figure 1:
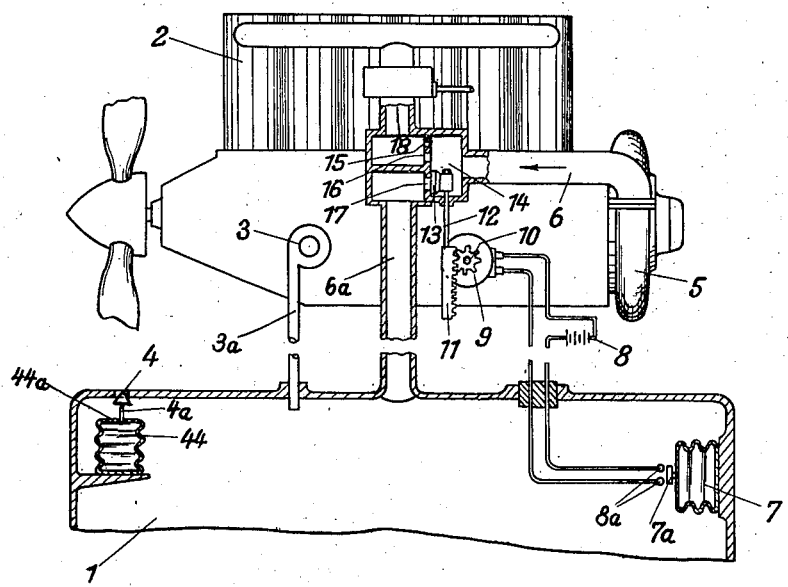
Figure 1 illustrates a view, partly in section, showing a motor provided with a supercharger, a cabin, means for maintaining air pressure therein, and also means for curtailing the supply of compressed air from the supercharger to the motor.
Figure 2:
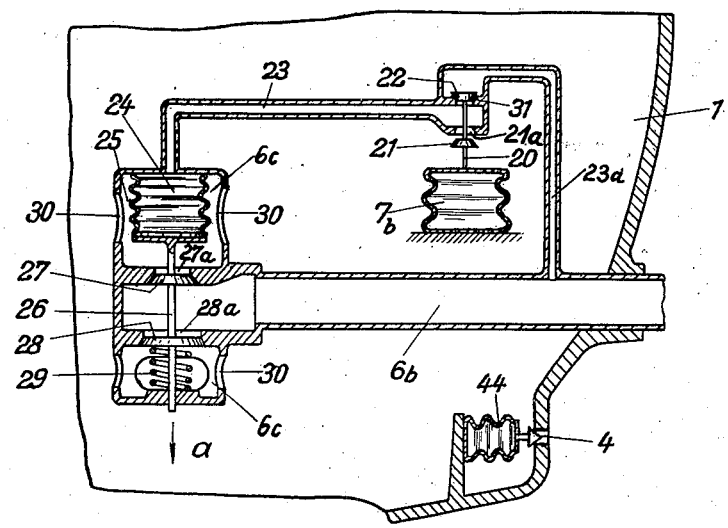
Figure 2 is a sectional view showing a modified arrangement for admitting air directly into the cabin from the supercharger.

Referring to Figures 1 and 2 of the drawings, I designates a portion of an airplane cabin, 2 is an airplane motor, and 3 is an air pump which is usually operated by the motor 2. Extending from the pump 3 is a discharge pipe 3a through which fresh air is discharged into the cabin I to maintain a satisfactory air pressure therein. Through the wall of the cabin I a vent 4 is provided which is adapted to be closed by a valve 4a. Automatic means are provided for moving the valve and opening and closing the vent to exhaust stale air from the cabin and to limit the escape of air therethrough so that a satisfactory air pressure is maintained in the cabin.

One of the methods which may be employed for operating the valve 4a is as follows: Suitably mounted in the cabin I opposite the vent 4 is an expansion chamber 44, preferably of the bellows type, which is filled with fluid under pressure. The valve 4a extends from the movable extremity 44a of the chamber 44. When the air pressure in the cabin exceeds a predetermined limit this pressure acting upon the said movable extremity forces the latter inwardly and consequently withdraws the valve 4a from the vent 4 so that air escapes therethrough. As soon as the air pressure in the cabin drops sufficiently the movable extremity 44a of the chamber 44 is moved outwardly by the fluid pressure therein and the valve 4a again closes the vent 4. Consequently under ordinary conditions only a relatively small air pump is required to furnish a satisfactory fresh air supply at the desired pressure within the cabin.

In Figure 1 is shown a supercharger 5 operated by motor 2 which delivers air under pressure through a pipe 6 into a chamber 14 which is connected by ports 15 and 16 to a passage 18 through which the compressed air travels to be mixed with the fuel for combustion in the motor 2. The chamber 14 is also provided with another port 17 which opens into an extension pipe 6a which projects into the cabin 1 and terminates therein in an open end. A slide valve 13 normally closes the port 17 so that under ordinary circumstances none of the compressed air from the pipe 6 passes into the extension 6a. However, means are provided for moving the slide valve 13 to open the port 17 and close the port 16 if the air pressure in the cabin 1 drops below a predetermined minimum, as would occur in spite of the air delivered by the pump 3, if considerable leakage occurred through the cabin walls at high altitude.

Fixed upon the shaft of an electric motor 9 is a gear 10 which meshes with a rack 11 provided upon a rod 12 which projects from the slide valve 13. Consequently, upon operation of the motor 9 the valve 13 is moved to open the port 17 and close the port 16.

The electric motor is set in motion in the following manner: An expansion chamber 7 filled with gas under pressure is provided within the cabin 1 and carries a contact 7a upon its movable wall. The motor 9 is in an electric circuit 8 which includes terminals 8a. The latter are connected and the circuit closed when the expansion chamber pressure moves the said movable wall outwardly and causes the contact 7a to connect the terminals 8a. This occurs when the pressure in the cabin drops below a predetermined minimum.

When the slide valve 13 has been moved to cover the port 16 the port 15 still remains uncovered so that some of the air discharged by the supercharger 5 still passes into the passage 18. However the cross sectional area of the port 15 is very restricted and consequently the volume of compressed air which then reaches the engine is so reduced that the speed of the motor is diminished to such an extent that the airplane is compelled to descend to a lower altitude.

In the arrangement shown in Figure 2 an extension 6b is connected to the supercharger pipe—not shown—and projects into the cabin 1. Formed through opposite sides of the extension 6b are aligned ports 27a and 28a, and projecting laterally on both sides of the extension, and in the present instance integral therewith, is a cage 6c. Mounted upon the latter is an expansion chamber 25 having a rod 26 secured upon its movable wall for axial movement. Secured upon the rod 26 are spaced valves 27 and 28 which normally close the ports 27a and 28a respectively. Extending between the valve 28 and one side of the cage 6c is a helical spring 29 which tends to retain the valves upon their seats.

Opening into the interior 24 of the expansion chamber 25 is a tubular connection 23 which is closed at its opposite extremity, and adjacent thereto aligned ports 21a and 31 are formed through opposite sides of the said connection. Terminating against one side of the connection 23 and adapted to be in communication therewith through the port 31 is a branch 23a, the opposite extremity of which opens into the extension 6b intermediately of its length.

Suitably mounted in the cabin 1 is an expansion chamber 7b which is filled with fluid under pressure, and has a valve stem 20 projecting from its movable wall. Secured upon the stem 20 is a valve 21 adapted to close the port 21a and normally spaced therefrom, and also a valve 22 which normally closes the port 31 and is adapted to be moved into the branch 23a to provide communication from the latter into the tubular connection 23. So long as the air pressure in the cabin is above a predetermined minimum the valves 21 and 22 remain in the positions shown in Figure 2. Then the pressure of the air which passes from the cabin through the port 21a into the expansion chamber 25 is insufficient to move the valves 27 and 28 off their seats against the tension of the spring 29 and consequently the said valves remain closed. But as soon as the cabin air pressure drops below that minimum, the fluid pressure in the expansion chamber 7b moves the valve 21 onto its seat 21a and the valve 22 off its seat 31. Then compressed air in the extension 6b flows through the tubular connection 23 into the body 24 of the expansion chamber 25, moves the rod 26 axially, and thereby lifts both the valves 27 and 28 off their seats. Then air from the extension 6b flows through the ports 27a and 28a and escapes into the cabin 1. To facilitate this air movement the sides of the cage 6c are suitably apertured as shown at 30.

In the modification shown in Figure 3, an extension 6d is provided from the discharge pipe 6 through which compressed air is discharged from the supercharger 5 to the motor 2. The opposite extremity of the extension 6d terminates in an open end within the cabin 1. Around the mouth of the extension 6d a cage 6e is provided having apertured sides. A valve 131a is adapted to close the mouth of the extension 6d and has a stem 131 guided in the cage 6e for movement coaxial with the extension 6d. Between the valve 131a and the cage 6e, and around the stem 131 a helical spring 32 is provided. So long as the tension of the spring and the air pressure in the cabin are sufficient to overcome the pressure of the compressed air in the extension 6d the valve remains closed; however as soon as there is no longer sufficient air pressure in the cabin to assist the spring 32 to hold the valve 131a upon the mouth of the extension 6d compressed air in the latter unseats the valve and flows freely into the cabin.

In the modification shown in Figure 4, a housing 133 is provided into which the extension 6f, connected to the discharge side of the supercharger, extends. The opposite extremity of this housing 133 opens into a cabin 1. Provided in the housing 133 is a double piston 33; against the upper piston 33a the pressure of the compressed air from the extension 6f is exerted, and the air pressure in the cabin 1 is exerted in the opposite direction against the piston 33b. Formed through the housing 133 between the upper and lower piston portions is an opening 34 to admit air from the outside. The double piston 33 is normally maintained in the position by a spring 35 which assists the air pressure in the cabin to balance the pressure of the compressed air. However, when the cabin air pressure drops below a predetermined minimum the piston 33 is moved against the tension of the spring and connects one extremity of a passage 135, formed through the housing 133, with the extension 6f; and since the opposite extremity of the said passage opens into the cabin 1, compressed air then flows into the latter from the extension 6f.

Referring to the modification shown in Figure 5, the extension 6g, from the discharge side of the supercharger, terminates in an open mouth 6h within the cabin 1. The mouth 6h is normally closed by a safety plate 36; however, when the difference in the air pressures on opposite sides of the plate exceeds a predetermined amount the latter becomes ruptured, and the compressed air flows freely into the cabin 1. Thus again, admission of the compressed air into the cabin is instituted when the difference between the pressures of the compressed air and the air in the cabin exceeds a predetermined amount.

It will further be noted that the size of the extension 6d (or 6b, 6f or 6g) may be proportioned relative to the size of the portion of the supercharger discharge pipe through which the compressed air passes to the motor so that when the extension outlet into the cabin is opened, the air supply to the motor is so reduced that the speed of the latter is retarded sufficiently to necessitate a descent to a lower altitude.

What I claim is:

1. An arrangement for maintaining air at sufficient pressure in an airplane cabin comprising a cabin, a supercharger for compressing air, means operating the latter, a tubular extension from the discharge side of the supercharger terminating in the cabin, a valve in said extension, a spring tending to hold said valve closed, the air pressure in the cabin also tending to hold said valve closed, whereby a drop in air pressure in the cabin causing a predetermined increased difference between the pressure of the compressed air discharged from said supercharger and the cabin air pressure forces the valve to open position against the tension of the spring and admits compressed air from the extension into the cabin.

2. An arrangement of the character described comprising an airplane including a cabin, a motor, a supercharger, and means connecting the latter with the motor, a tubular extension from said means terminating in the cabin, a valve normally closing the extension in the cabin, a tubular connection from the extension, a second valve normally closing the connection intermediately of its length, means connected to the second valve adapted to be moved by a drop in air pressure in the cabin to open said second valve and permit a flow of air through the connection, and means mounted on the connection actuated by a flow of air through the latter to open the first named valve and permit air from the extension to flow into the cabin.

3. In an aircraft having a closed cabin, an engine, and a supercharger coupled therewith, a conduit extending from the supercharger communicating with the cabin interior, a valve in said conduit, valve operating means exposed to cabin pressure on one side and to pressure from the supercharger on the other, and yieldable means supplementing the cabin pressure urging the valve into conduit closing position.

4. In an aircraft having a closed cabin, an engine, and a supercharger coupled therewith, a conduit communicating with the cabin interior extending from the supercharger, a valve controlling communication between the conduit and the cabin interior, valve operating means subject on opposite sides, respectively, to cabin and conduit pressure operable to open and close said conduit, and yieldable means exerting pressure on said valve supplementing the cabin pressure in a valve closing direction, whereby a predetermined differential between cabin and supercharger pressure operates said valve means.

5. The arrangement set forth in claim 4 wherein said valve is normally under supercharger pressure in both opening and closing directions, a valve controlled bypass extends from the conduit to the opening pressure side of the operating means for said first-mentioned valve, and a cabin pressure control device actuates said bypass valve.

6. In an aircraft having a closed cabin, an engine, and a supercharger coupled therewith, a conduit extending from said supercharger into the cabin, a valve controlling communication between the conduit and the cabin interior, means subject to pressure in said conduit for operating said valve, said means being open to cabin pressure, means yieldably urging said valve to closed position, a bypass from said conduit communicating with said valve-operating means whereby opening pressure is transmitted to the same, a valve in said bypass, and cabin pressure controlled valve operating means for operating said latter valve.

HERBERT WAGNER.